United States Patent [19]

Iggulden et al.

[11] Patent Number: 5,692,093

[45] Date of Patent: *Nov. 25, 1997

[54] METHOD AND APPARATUS FOR ELIMINATING TELEVISION COMMERCIAL MESSAGES

[75] Inventors: Jerry Iggulden, Santa Clarita; Alan McFarland, North Hollywood, both of Calif.; Stuart J. Lipoff, Newton, Mass.; Jung-ming Wu; Richard H. Caro, both of Acton, Mass.; Raymond E. Debs, Saratoga, Calif.

[73] Assignee: SRT, Inc., Cambridge, Mass.

[*] Notice: The term of this patent shall not extend beyond the expiration date of Pat. No. 5,333,091.

[21] Appl. No.: 177,813

[22] Filed: Jan. 4, 1994

Related U.S. Application Data

[63] Continuation-in-part of Ser. No. 2,782, Jan. 8, 1993, Pat. No. 5,333,091, and a continuation-in-part of Ser. No. 103,067, Aug. 6, 1993, Pat. No. 5,455,630.

[51] Int. Cl.$^6$ .................................................. H04N 5/76
[52] U.S. Cl. ........................... 386/46; 358/908; 386/52; 386/68; 386/126; 360/69
[58] Field of Search ..................... 358/335, 908; 360/14.1, 14.2, 14.3, 33.1, 69, 71, 74.5; 386/46, 52, 64, 65, 68, 69, 125, 126; H04N 5/76

[56] References Cited

U.S. PATENT DOCUMENTS

| | | | |
|---|---|---|---|
| 2,424,216 | 7/1947 | Atkins | 179/1 |
| 2,630,525 | 3/1953 | Tomberlin et al. | 250/6 |
| 2,761,697 | 9/1956 | Jones | 179/1 |
| 3,011,030 | 11/1961 | Langendorf | 179/100.1 |
| 3,424,865 | 1/1969 | Marchand | 178/5.8 |
| 3,628,153 | 12/1971 | Fukata | 325/395 |
| 3,681,523 | 8/1972 | Sidline | 178/6.6 A |
| 3,725,604 | 4/1973 | Alexander | 179/100.1 |
| 3,730,986 | 5/1973 | Morchand | 178/5.6 |

(List continued on next page.)

FOREIGN PATENT DOCUMENTS

| | | |
|---|---|---|
| 0158293 | 10/1985 | European Pat. Off. |
| 0161512 | 11/1985 | European Pat. Off. |
| 0 378 393 | 1/1990 | European Pat. Off. |
| 0 505 683 | 1/1992 | European Pat. Off. |
| 0 526 739 | 7/1992 | European Pat. Off. |
| 31 35 806 | 9/1981 | Germany. |
| 32 17 557 | 5/1982 | Germany. |
| A 57088542 | 11/1980 | Japan. |
| 0146072 | 5/1983 | Japan. |
| 1-174192 | 12/1987 | Japan. |
| A 4255949 | 2/1991 | Japan. |
| 4-283 447 | 3/1991 | Japan. |
| 03292655 | 12/1991 | Japan. |
| 4322581 | 11/1992 | Japan. |
| 2 246 233 | 7/1990 | United Kingdom. |
| WO 81/00945 | 4/1981 | WIPO. |

*Primary Examiner*—Khoi Truong
*Attorney, Agent, or Firm*—Blakely, Sokoloff, Taylor & Zafman

[57] ABSTRACT

During recording of a television signal on a VCR, data are accumulated with respect to the time of occurrence and duration of detectable events, such as blank frames, in the television signal, and such data are stored. Timing reference data are written onto the tape as it is recorded. At a time subsequent to the recording process, the stored data are analyzed to classify the content of the television signal between the detectable events and a playback map is constructed for the recorded signal. During playback, the stored playback map is retrieved and stored timing data are compared to the timing reference data read from the tape. The VCR is automatically commanded into a fast scan mode when the tape reaches the beginning time of a portion of the video signal that has been classified for elimination during playback. The VCR is then automatically commanded to return to the normal "play" mode when the tape reaches the ending time of that portion of the video signal. Since all of the television signal is recorded on the tape, any or all of the signal may be viewed, even if portions of it have been misclassified.

24 Claims, 13 Drawing Sheets

U.S. PATENT DOCUMENTS

| | | | |
|---|---|---|---|
| 3,745,240 | 7/1973 | Morchand et al. | 178/5.6 |
| 4,229,765 | 10/1980 | Sanger | 358/188 |
| 4,259,689 | 3/1981 | Bonner | 358/165 |
| 4,314,285 | 2/1982 | Bonner et al. | 360/33 |
| 4,319,286 | 3/1982 | Hanpachem | 360/33 |
| 4,325,088 | 4/1982 | Wright | 360/14 |
| 4,343,024 | 8/1982 | Kawai | 360/74.5 X |
| 4,350,999 | 9/1982 | Mortimer | 348/479 |
| 4,390,904 | 6/1983 | Johnston et al. | 358/335 |
| 4,430,676 | 2/1984 | Johnson | 360/13 |
| 4,438,451 | 3/1984 | Hinn et al. | 348/557 |
| 4,492,993 | 1/1985 | Otis | 360/74.5 |
| 4,520,404 | 5/1985 | Von Kohorn | 358/335 |
| 4,570,192 | 2/1986 | Hori | 360/14.2 |
| 4,587,572 | 5/1986 | DiGiulio | 360/14.3 |
| 4,602,297 | 7/1986 | Reese | 360/14.1 |
| 4,605,973 | 8/1986 | Von Kohorn | 358/335 |
| 4,618,895 | 10/1986 | Wright | 358/311 |
| 4,672,470 | 6/1987 | Morimoto et al. | 358/323 |
| 4,745,476 | 5/1988 | Hirashima | 348/478 X |
| 4,750,052 | 6/1988 | Poppy et al. | 358/335 |
| 4,750,053 | 6/1988 | Allen | 358/335 |
| 4,750,213 | 6/1988 | Novak | 455/67 |
| 4,752,834 | 6/1988 | Koombes | 358/908 X |
| 4,774,600 | 9/1988 | Baumeister | 360/14.3 |
| 4,777,537 | 10/1988 | Ueno et al. | 358/342 |
| 4,782,401 | 11/1988 | Faerber et al. | 358/335 |
| 4,879,611 | 11/1989 | Fukui et al. | 360/69 |
| 4,918,531 | 4/1990 | Johnson | 358/183 |
| 4,979,047 | 12/1990 | Wine | 358/335 |
| 5,019,899 | 5/1991 | Boles et al. | 358/84 |
| 5,057,932 | 10/1991 | Lang | 358/335 |
| 5,063,456 | 11/1991 | Horiuchi et al. | 348/478 X |
| 5,075,546 | 12/1991 | Kamada et al. | 250/231.1 |
| 5,151,788 | 9/1992 | Blum | 358/188 |
| 5,333,091 | 7/1994 | Iggulden et al. | 358/908 |
| 5,488,409 | 1/1996 | Yuen et al. | 348/5 |

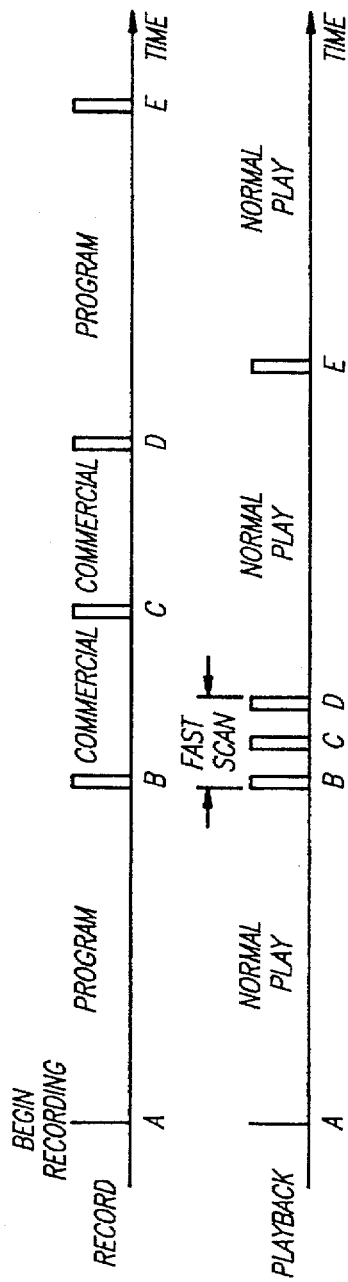
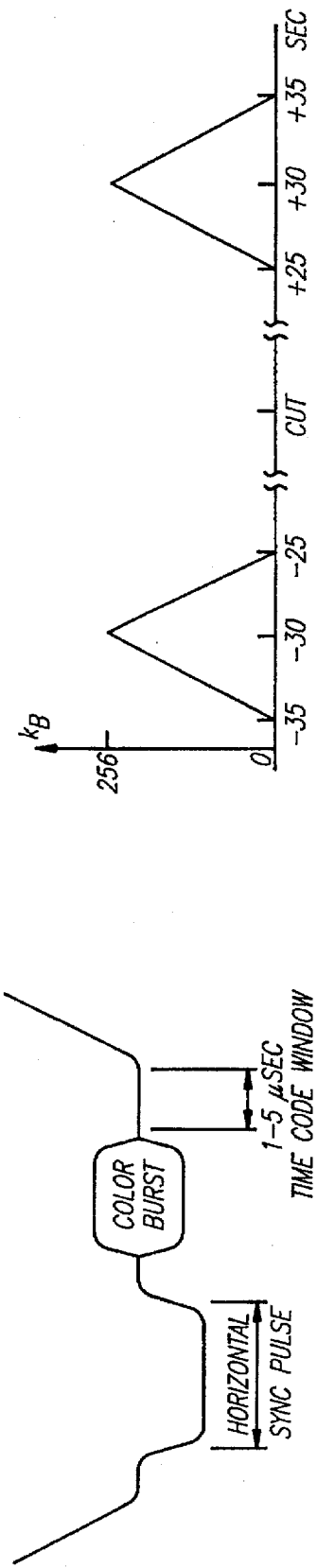
FIG. 3
FIG. 11
FIG. 4

FIG. 14
PRIOR ART
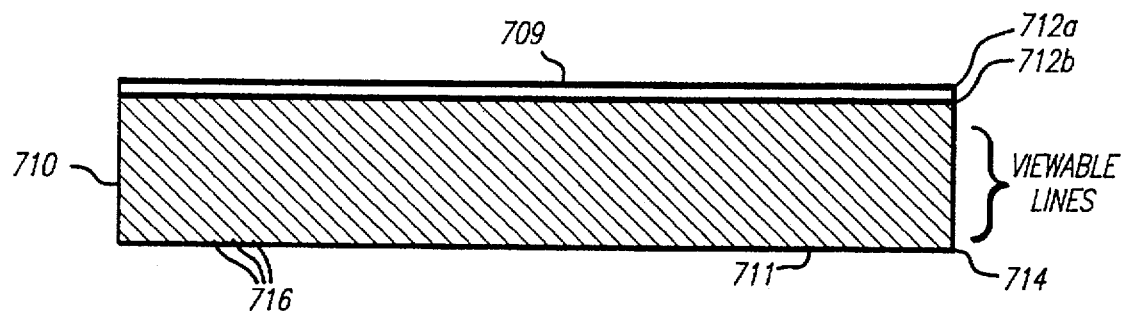
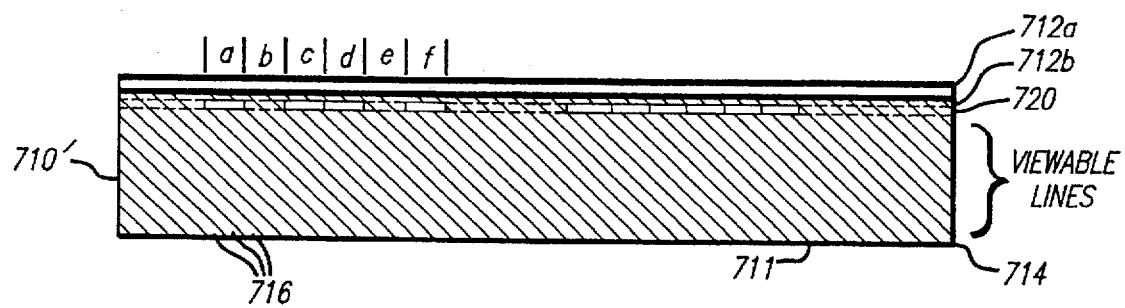
FIG. 15

METHOD AND APPARATUS FOR ELIMINATING TELEVISION COMMERCIAL MESSAGES

BACKGROUND OF THE INVENTION

1. Related Applications

This is a continuation-in-part of application Ser. No. 08/002,782 filed Jan. 8, 1993, now U.S. Pat. No. 5,333,091 and of application Ser. No. 08/103,067 filed Aug. 6, 1993, now U.S. Pat. No. 5,455,630.

2. Field of the Invention

This invention relates to the field of video recording and playback systems, and particularly to a method and apparatus for selectively omitting certain program content during playback of a recorded video signal.

3. Background Art

It is commonplace to record a commercially broadcast television program on a video tape recorder (VTR, also referred to as a video cassette recorder or VCR) for viewing at a later time. When later viewing the recorded program, many, if not most, viewers prefer to watch only the program material without also viewing commercials, promotional messages and the like that are typically broadcast at intervals during the program.

Even before the advent of popularly priced videotape recorders, there have been many attempts to provide home television viewers with a system to suppress commercial messages. Early efforts included systems that would mute the audio signal for a predetermined period of time when a commercial message was sensed. As VCRs became more popular and "time-shifting" became a convenient way to view television programs, more sophisticated methods for eliminating commercial messages have been proposed.

One prior art approach to commercial elimination has been to pause the VCR in the record mode when a commercial message is sensed. A system of this type is disclosed in U.S. Pat. No. 4,319,286, which issued on Mar. 9, 1982 to Hanpachern. In this system, the absence of video modulation during a video frame (i.e., a blank frame) is detected and used to trigger a timing circuit. When triggered, the timing circuit causes a pause command to be sent to a videotape recorder. The pause command remains asserted for a predetermined period of time, or longer if the timing circuit is retriggered. For example, the timing circuit may be set for 32 seconds so that if blank frames are detected at 30 second intervals (a typical length for a commercial message) the VCR will remain in the pause mode until 32 seconds after the last such blank frame. Quite a few prior art references disclose variations on this type of system, wherein the VCR is paused for a fixed period of time following detection of a blank frame in the video signal. For example, PCT Application No. WO81/00945 by Johnston and Koombes discloses a system of this type. Such systems are claimed to be relatively effective for eliminating commercial messages, but suffer certain drawbacks. In this regard, program material immediately following a commercial break is irretrievably lost since the VCR is held in the "pause" mode for a predetermined period of time (30 to 60 seconds or more) following each break in the television signal. Furthermore, additional program material may be irretrievably lost if the timing circuit is falsely triggered, such as by a fade between scenes in the program.

Other prior art systems have sought to overcome these drawbacks. For example, U.S. Pat. No. 5,151,788 to Blum discloses a system for eliminating commercials from a video signal that performs real time analysis of the video signal immediately following a blank frame. If there is a high level of "activity" in the signal immediately following a blank frame, a commercial message is presumed and the VCR is commanded to pause. On the other hand, if a low level of activity is detected, the preceding blank frame is presumed to be a fade and the VCR is commanded to resume recording. This approach solves the problem of losing a fixed amount of program material if a VCR pause if falsely triggered, but it is still susceptible to misclassification. If a program fade is immediately followed by an "active" scene, this will be misclassified as a commercial. On the other hand, a commercial with a low level of "activity" will be misclassified as program material.

A different approach to eliminating commercial messages is to automatically rewind a VCR to the beginning of a commercial message each time one is detected while recording a television program. One such system is disclosed in U.S. Pat. No. 4,750,052, which issued on Jun. 7, 1988 to Poppy and Samelson. A virtually identical system is disclosed in U.S. Pat. No. 4,752,834, which issued on Jun. 21, 1988 to Koombes. In both of these systems, fades (i.e., blank frames) in the video signal are detected and the time interval between successive fades is determined in a timing circuit. If the timing criteria for a commercial message are met, the VCR is rewound to the position of the fade associated with the beginning of the commercial message and the VCR is returned to the record mode. This process repeats for each commercial message that is detected. These systems permit an editing decision to be made after an entire commercial has been aired; however, as with the other systems previously described, program material is still irretrievably lost if there is a false detection of a commercial. Furthermore, the frequent rewinding of the tape during long commercial breaks accelerates the wear of the VCR tape transport mechanism as well as the tape itself.

Yet a different approach is disclosed by Mizuki in Japanese patent document 58-146072, which was published on Aug. 31, 1983. In this system, a video program is viewed by an operator as the program is recorded or is replayed. The operator places an electronic mark on the tape at the beginning and end of each commercial message or any other undesired recorded material. When the tape is subsequently replayed, either for viewing or transcription to another tape, the VCR is commanded to fast-forward through the portions of tape bounded by the applied marks. This system relies entirely on human intelligence to classify the different portions of the video signal.

Still other systems are known that discriminate commercial messages based on characteristics of the transmitted video signal. A system of this type has been marketed in Japan by Mitsubishi under the name "Auto-Cut". In this system, the audio channel is monitored for the presence of a second audio program (SAP) and/or stereo modulation. Many of the programs that viewers wish to tape are broadcast in dual languages (e.g., Japanese and English) and/or with monaural sound. However, commercial messages in Japan are generally broadcast in stereo and in the Japanese language only. Thus, a VCR with the Auto-Cut system is able to record a monaural program or one with SAP and suspend recording during commercials. Other systems marketed in Japan operate on a similar principle, but record the entire program and then place the VCR in a fast scan mode during playback when stereo sound or the absence of SAP is detected.

All known prior art commercial elimination systems rely on real-time signal analysis to classify the broadcast signal as program material or as a commercial message. This is true whether the classification is being performed during the recording or playback process. The signal analysis and classification performed in prior art systems do not examine detected events in the context of surrounding events. Thus, misclassification is relatively common. In the case of systems that discriminate during the recording process, such misclassification will cause portions of program material to be irretrievably lost.

SUMMARY OF THE INVENTION

One of the objects of the present invention is to provide a method and apparatus for automatically editing a recorded television signal during playback.

Another object of the present invention is to provide a method and apparatus for determining the presence of a commercial message in a recorded television signal by performing analysis of the signal at a time subsequent to the recording session.

A further object of the present invention is to provide a method and apparatus by which a television signal may be recorded in its entirety and later replayed such that certain portions of the television signal, particularly commercial messages, are automatically scanned past at high speed.

These and other objects of the present invention are achieved with electronic circuitry that may be included within a VCR or that may be embodied in a separate device that is coupled to a conventional VCR. During recording of a television signal, data are accumulated with respect to the time of occurrence and duration of detectable events, such as blank frames, in the television signal, and such data are temporarily stored. Throughout the recording session, timing data, including a unique session identification, are written onto the tape. At a time subsequent to the recording session, the stored data are analyzed to classify the content of the television signal between the detectable events. A "playback map" is then constructed and stored in a permanent memory. The playback map contains data identifying the portions of the recorded television program that are to be eliminated during playback of the videotape.

During playback of the recorded videotape, the stored playback map is retrieved from memory and the data are compared to the timing data read from the tape. The VCR is automatically commanded into a fast scan mode when the tape reaches the beginning time of a portion of the video signal that has been classified for elimination during playback. The VCR is then automatically commanded to return to the normal "play" mode when the tape reaches the ending time of that portion of the video signal. Since all of the television signal is recorded on the tape, the entire signal is preserved for viewing, even if portions of it have been misclassified.

A commercial detection algorithm uses the "black frames" (i.e., television frames in which there is no significant video signal) and "silent frames"(i.e., television frames in which there is no significant audio signal) that are typically observed between commercial messages and broadcast programs to detect where the commercial messages begin and end. The video signal is divided into segments defined by transitions from or to black frames and silent frames and each segment is then analyzed with respect to surrounding segments to determine whether it is part of a commercial message or program material. Contiguous groups of segments that are classified as commercial messages define a commercial cluster that will be scanned past during playback of the recorded videotape.

The commercial detection algorithm employs a polynomial "detection equation" in which each term is defined as an attribute of the data weighted by a constant for that term. The sum of the weighted terms provides a total value for each program segment that is compared to a global threshold. Segments having a value exceeding the threshold are classified as commercial messages, whereas those having a value below the threshold are classified as program material.

BRIEF DESCRIPTION OF THE DRAWINGS

FIG. 3 illustrates the recording and playback functions of the present invention.

FIG. 4 illustrates the method of time coding the video signal employed with the present invention.

FIG. 11 illustrates calculation of the terms of the commercial detection algorithm used with the present invention.

FIG. 14 illustrates the manner in which signals are recorded on a conventional videotape.

FIG. 15 illustrates the manner in which a videotape may be encoded with permanent timing indicia for use in an alternative embodiment of the present invention.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

System Overview

Figure 1:
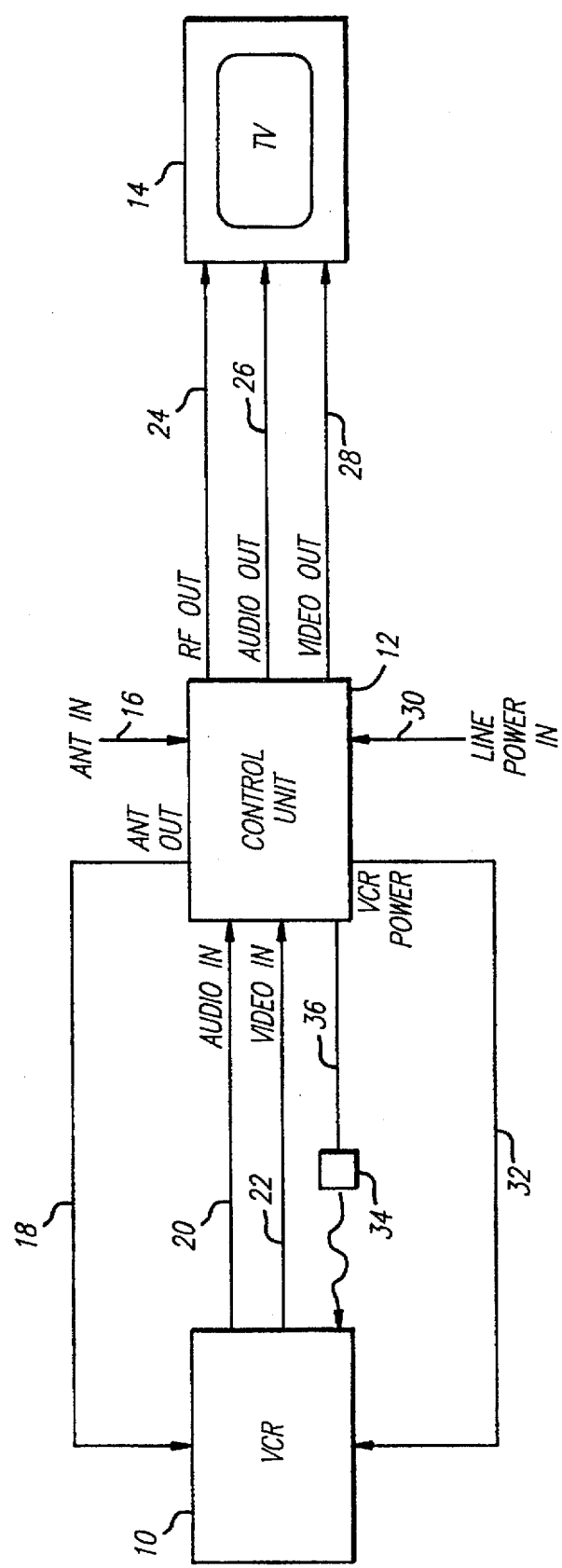
FIG. 1 is a functional block diagram of a commercial elimination system according to the present invention.

Referring first to FIG. 1, an exemplary system embodying the present invention is illustrated. This particular system is configured as a "stand alone" control unit 12 for operation with a conventional video cassette recorder (VCR) 10; however, the invention is not limited in this regard and may be employed with other types of recording equipment, including, for example, reel-to-reel magnetic tape recorders and writable optical disc recorders. Furthermore, the present invention may be advantageously implemented as a "built-in" feature of a VCR, in which case many of the functional interfaces with a separate VCR that are described below are unnecessary. Implementation of the invention as a built-in feature of a VCR will be more fully discussed in a subsequent section of this specification.

Control unit 12 is coupled between VCR 10 and a conventional television receiver/monitor 14. A broadband RF input signal is supplied to control unit 12 on line 16 in a conventional manner. The RF input may be connected to any appropriate source of television signals, such as an antenna, cable jack or a cable converter box. The television signal is supplied from control unit 12 to VCR 10 on cable 18. The audio output(s) 20 and video output 22 of VCR 10 are supplied as inputs to control unit 12.

Control unit 12 is equipped with both audio/video and RF output jacks to provide either type of signal to television 14. The control unit is coupled to the television either by RF cable 24 or, if the television is equipped with monitor inputs, by audio and video cables 26 and 28, respectively.

Line power for control unit 12 is received through cord 30. VCR 10 must be plugged into control unit 12 using VCR power cord 32 so that the current drawn by the VCR can be monitored by the control unit.

Control unit 12 includes a transmitter 34 for communicating with the remote control input of VCR 10. Since VCRs are now almost universally equipped with infrared (IR) remote control devices, transmitter 34 is preferably an IR emitter. Since an IR emitter must be placed within a line of sight of the VCR's IR receiver, emitter 34 is preferably coupled to control unit 12 by a cable 36 so that it may be placed in a convenient location for transmitting control signals to VCR 10.

As a program is recorded by the VCR, the pattern, duration and interval of "features" or "events" in the video signal are detected by control unit 12 and information with respect thereto is stored for later analysis. Based on an analysis of the stored data, the video signal between the detectable events is classified according to whether or not it is to be viewed upon playback of the videotape. In particular, the pattern, duration and interval of "black frames" and "silent frames" are analyzed to determine when commercial messages are present in the video signal so that those portions of the video signal can be rapidly scanned past during playback. A time-based "playback map" of the video signal is created and stored in control unit 12 for controlling advancement of the videotape during playback by means of IR emitter 34.

Figure 2:
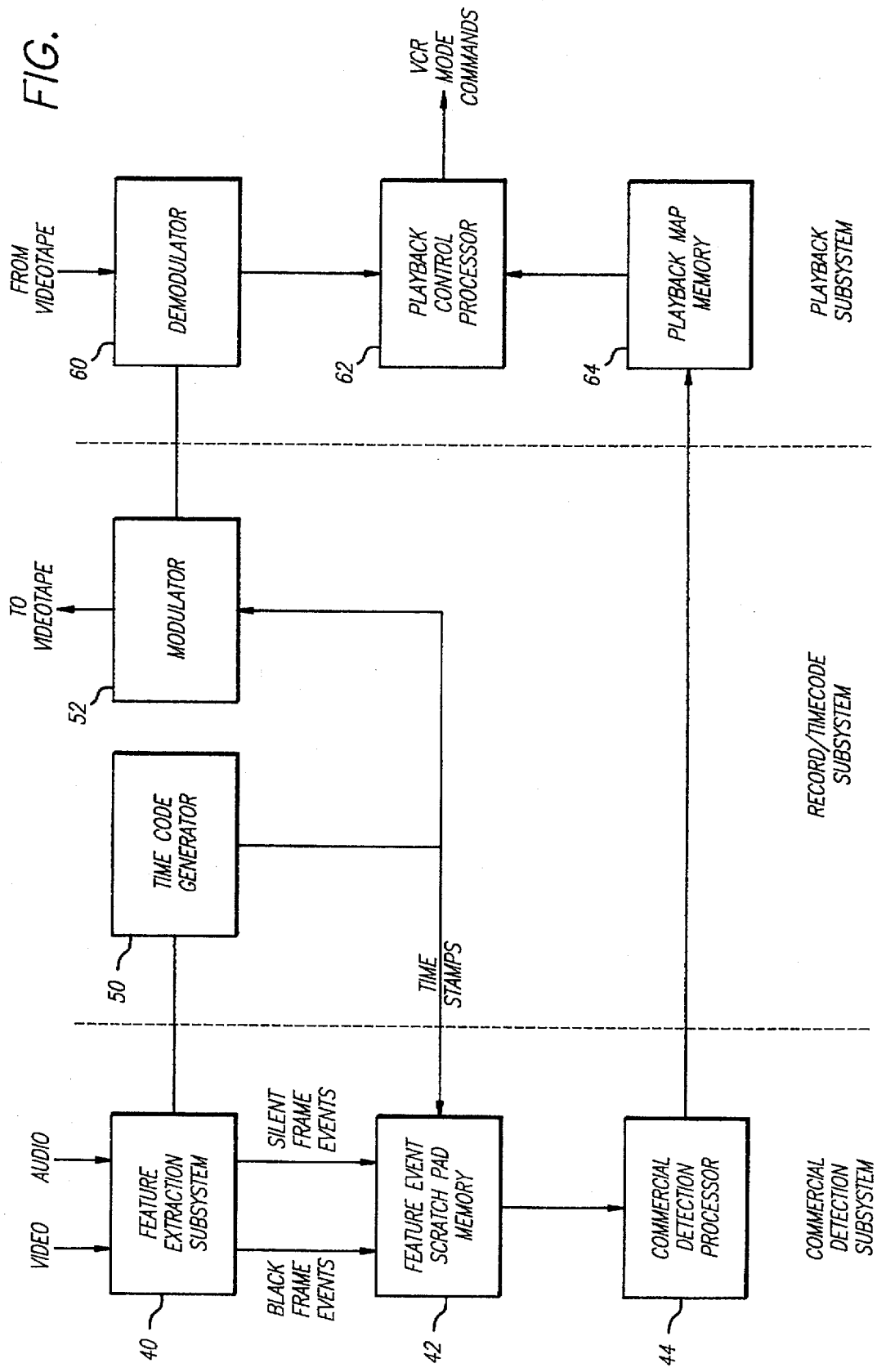
FIG. 2 is an expanded functional block diagram of the control unit of the system shown in FIG. 1.

FIG. 2 shows a functional partitioning of control unit 12. A commercial detection subsystem comprises feature extraction subsystem 40, feature event scratch pad memory 42 and commercial detection processor 44. The feature extraction subsystem 40 receives video and audio signals from the VCR and detects black frame events and silent frame events. These events are stored in the feature event scratch pad memory along with time stamps indicating when they occurred. The time stamps comprise a digital code provided by time code generator 50. At the end of a recording session, the commercial detection processor analyzes the events which have been stored in the scratch pad memory. The commercial detection processor implements a non-causal commercial detection algorithm that looks both forward and backward in time. Commercial clusters within the television program are identified and a playback map is stored in playback map memory 64 for use when the recorded videotape is replayed.

A recording/time code subsystem comprises time code generator 50 and modulator 52. As previously mentioned, time code generator 50 produces a digital code that is utilized as a time stamp for the events extracted from the video signal. These codes are also provided to modulator 52 which writes the codes, together with a unique session identification code, onto the videotape.

A playback subsystem comprises demodulator 60, playback control processor 62 and the aforementioned playback map memory 64. The time code and session identification code written onto the videotape are recovered during playback by demodulator 60. The time codes recovered from the videotape are correlated with the time stamps stored in the playback map memory by the playback control processor, which issues play/scan commands to the VCR. When the beginning time of each commercial cluster is reached, the VCR is automatically commanded to scan past (i.e., skip) the commercial cluster and resume normal play at the end thereof. While the VCR is scanning past the commercial cluster, a solid blue screen is preferably presented to the television viewer.

This process may be better understood with reference to FIG. 3. Referring to the upper portion of the diagram, recording of a television signal commences at event A. One or more black frames and/or silent frames are encountered at events B, C, D and E. When the recording is completed, the time of occurrence and duration of each detected event is analyzed as will be subsequently described, and each interval of the television signal is classified either as program material or as a commercial message. In the example portrayed in FIG. 3, it is determined that commercial messages have been broadcast between events B and C and also between events C and D. Event E is determined to be not associated with a commercial cluster. A playback map is constructed that designates the signal beginning at event B and ending with event D for elimination on playback. The signal immediately preceding the first detected event following the beginning of recording (i.e., between events A and B) is always presumed to be program material.

Upon playback of the videotape, the tape is rewound to the starting point (event A). The VCR commences playing the program in normal fashion until the tape reaches the position corresponding to the beginning of event B. Since the television signal between events B and C has been classified as a commercial message, the VCR is commanded into the fast scan mode and a solid blue screen is presented to the viewer. When the tape has advanced to the position corresponding to the end of event D, the VCR is commanded back into the play mode for normal viewing of the program material between events D and E.

Although the embodiments described herein are intended for use with a conventional "single deck" VCR, the present invention may also be advantageously employed with a "dual deck" VCR. In this case, recording of a program would proceed on a first deck of the VCR as just described. The analysis of the television signal may then be used to copy the program recorded on the first deck onto the second deck, but without the commercial interruptions. In this regard, the first deck may be commanded to alternate between the normal play and fast scan modes as described above while the second deck is recording. Alternatively, the second deck may be commanded to pause during the playback on the first deck of those portions of the television signal that have been classified as commercial material. In either case, the signal recorded on the second deck will contain only those portions of the signal that have been classified as program material.

Time Coding

A time code is inserted into the video signal as it is recorded by VCR 10. The broadband RF input signal supplied to VCR 10 from control unit 12 comprises a spectrum of video signals. The desired video signal is recovered from the RF carrier by a tuner circuit internal to the VCR. The video signal that is being recorded is inaccessible within control unit 12 prior to being recorded without using a separate tuner circuit tuned to the same channel as the VCR. Therefore, control unit 12 cannot insert a time code directly into the recorded video signal. However, modulation of the RF carrier signal will affect the recorded video signal. Hence, by modulating the RF carrier signal with a digital code, the digital code is recorded by the VCR along with the video signal. In the embodiment described below, coding modulation is performed with a switchable attenuator that is controlled by the digital code. The attenuator reduces the amplitude of the RF carrier by 6–20 dB, thereby inserting a pulse in all video signals on the carrier. The RF signal is encoded with a sequence of such pulses at periodic intervals to provide the time code.

A code inserted in this manner will appear as a random pattern when the video signal is displayed on the television receiver unless the code pulses are synchronized with the display raster. The control unit therefore processes the video signal provided from the video output terminal of the VCR to detect the vertical and horizontal synchronization pulses. The code may thus be inserted at any desired location in the display raster. Naturally, it is preferred that the code be embedded in a portion of the recorded video signal that will not be visible to the viewer and will not interfere with conventional test and reference signals.

Referring now to FIG. 4, the preferred method of time coding the video signal inserts a single bit pulse on the back porch of each horizontal sync pulse, immediately following the color burst signal. A time code window, which may be adjusted in both position and width, provides a gate signal for inserting 1–5 μsec. data pulses in the video signal. A logical "one" is encoded as an attenuation of the RF carrier signal, whereas a logical "zero" is encoded as an absence of attenuation. The data format comprises five eight-bit bytes with a single "one" between each byte and 11 "zeros" following the fifth byte. Fifty-five video lines are thus required to write the entire data format. This sequence is repeated four times in each video field. The first byte comprises an eight bit session identification code to uniquely identify each recording session. Although the entire data format is referred to herein as a "time code", it is to be understood that this includes the session identification code as well. The middle three bytes comprise a 24 bit time code that is incremented in each video field, thereby providing a running count of the video fields since the recording session began. The time code thus has a maximum count of over 77 hours, far exceeding the longest recording session that will be encountered. The fifth byte comprises a cyclic redundancy check (CRC) code for error detection and correction.

As will be clear from the following description, the primary purpose of the time code is to provide a tape position marker that can be used to unambiguously identify the beginning and ending of a recorded program segment during replay of the tape. The time coding method employed with this invention may be used to further advantage. For example, the time code can be readily used as an index for locating the beginning or ending of a recording session. Furthermore, since a unique session identification code is written on the tape in conjunction with the time code, it is possible to specify a particular recording session and to automatically index to the beginning or ending of the specified session. It should be observed that the time coding technique employed with this invention may also be used to encode other types of information on a recorded video signal. For example, such data may comprise text and/or graphics to be presented to the viewer in conjunction with playback of the recorded video signal. The encoding technique may also be advantageously applied as a data transfer medium. In this manner a specially prepared videotape with software updates or other data can be distributed to owners of the control units or modified VCRs described herein. The owners would simply "play" the videotape on their VCRs and the data would be decoded and stored in the program instruction or other memory. Special session identification codes may be designated for this purpose so that the control unit will properly process the encoded data.

Hardware Description

Figure 5A:
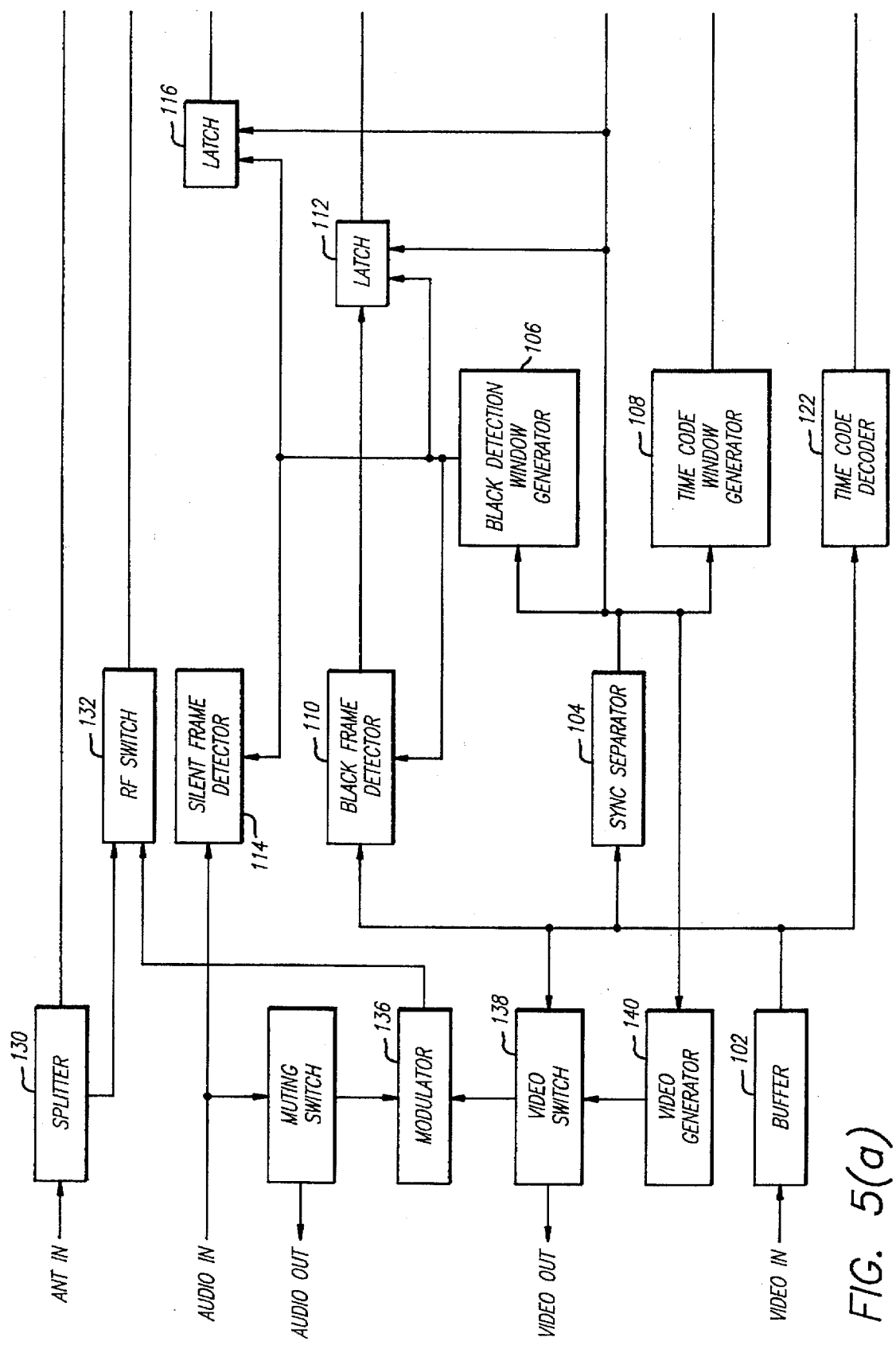
FIG. 5 is a further expanded functional block diagram of the control unit of the system shown in FIG. 1.
Figure 5B:
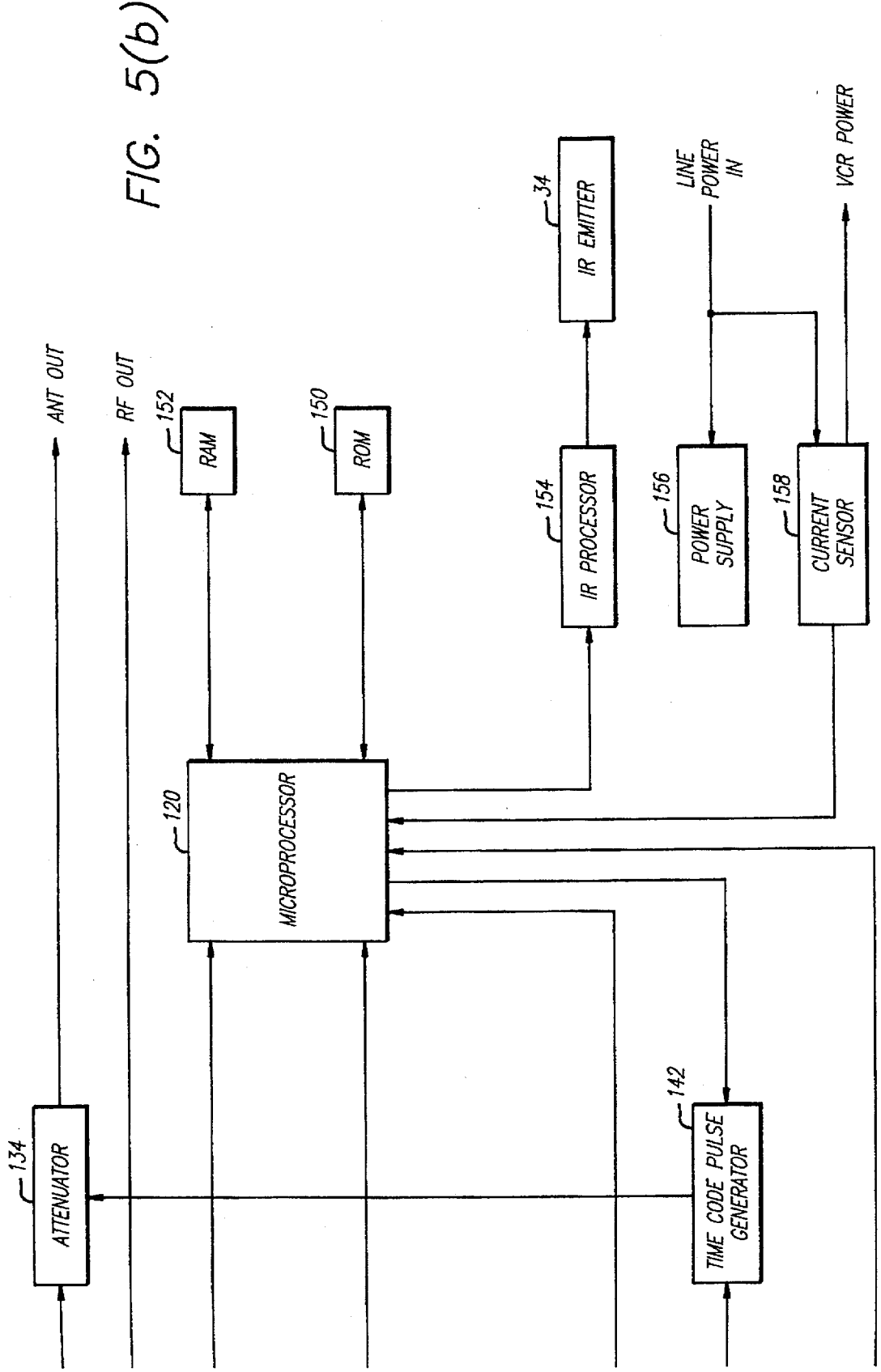

With reference now to FIG. 5, the construction of control unit 12 will be described at a more detailed functional level. The video signal from the VCR is received by control unit 12 at the VIDEO IN connector as mentioned above. The video signal is first buffered by circuit 102. The output of buffer 102 is provided to sync separator circuit 104 which detects the horizontal and vertical synchronization pulses within the video signal and provides logic level timing signals for the video processing circuitry. Sync separator 104 may be constructed with discrete components using well known video circuits or may utilize a commercially available integrated circuit such as a Motorola MC44145 device or equivalent. The principal timing circuits are black detection window generator 106 and time code window generator 108. Black detection window generator 106 provides a sampling window within the viewable portion of the video signal. Video lines adjacent to the vertical blanking interval are excluded from the black detection window so that various special purpose signals which may be carried within these lines will not cause a false reset of the black detection circuit. Likewise, the portion of each horizontal line adjacent to the horizontal synchronization pulse is excluded from the black detection window. The signal contained within the black detection window is thus representative solely of the audio and video content of the program being broadcast on the television signal.

The video output of buffer 102 is provided at black frame detector 110 where the signal level is clamped with respect to the back porch. If desired, a filter may be included to eliminate high frequency "snow". Detector 110 also receives the output from black detection window generator 106. If the clamped video signal exceeds a predetermined threshold anywhere within the black detection window, latch 112 is triggered. Latch 112 is read by microprocessor 120 at the end of each black detection window and is reset by the vertical sync pulse. Only a field which is completely devoid of video information will permit latch 112 to remain untriggered. Even night scenes in a television program will typically contain some video content sufficient to exceed the threshold within each frame so as to trigger latch 112. A "black frame" will be detected only when there is no video signal at all, such as is characteristic of frames immediately preceding and following commercial messages. The term "black frame" is used in this description even though the black frame detection latch is reset in each video field. As a practical matter, a "black" field will virtually always be accompanied by a "black" interleaved field, and the terms "black field" and "black frame" are used interchangeably.

Figure 6:
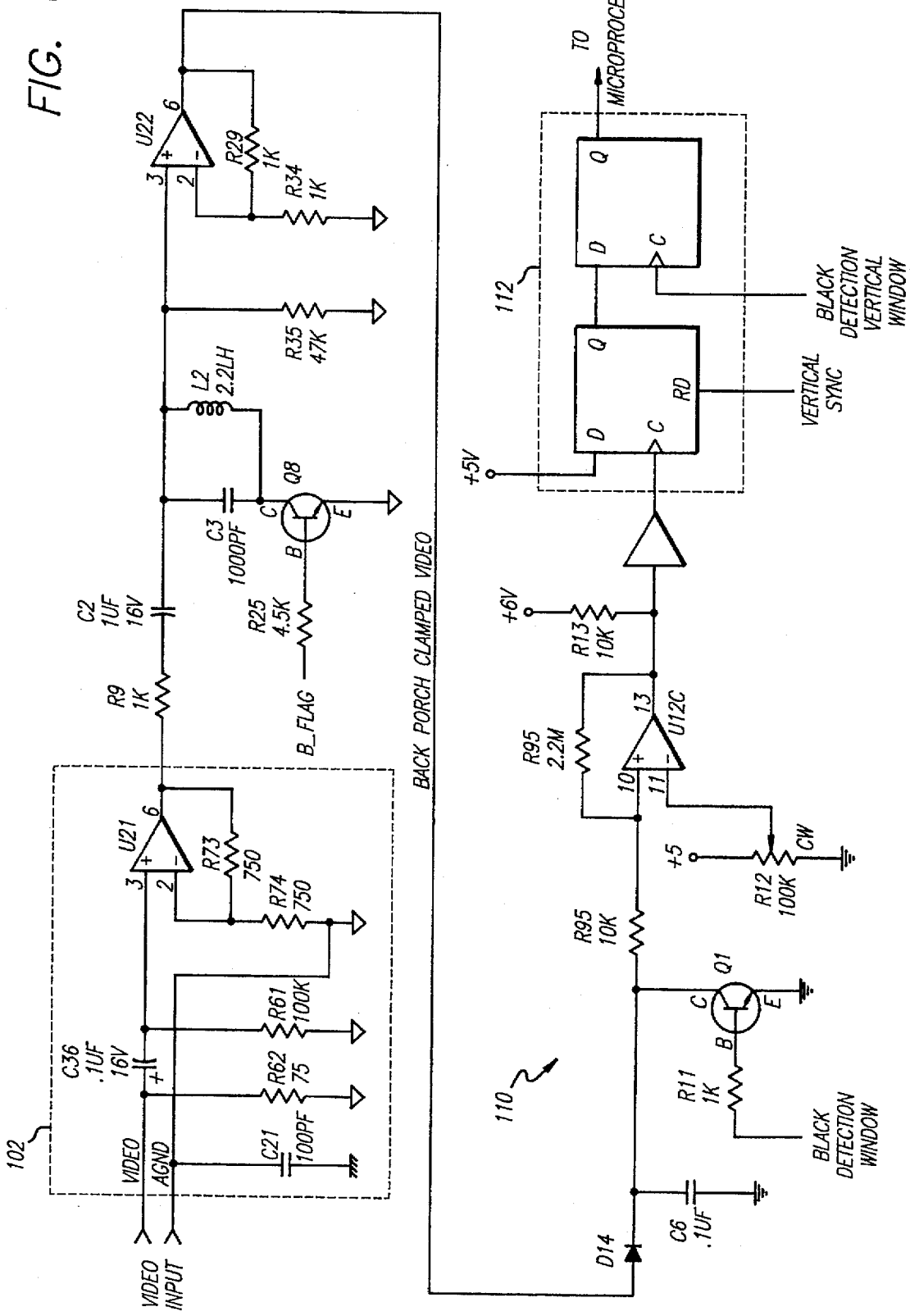
FIG. 6 is a schematic diagram of a black frame detector circuit suitable for use with the present invention.

Although the design of a suitable black frame detector is well within the capabilities of a person of ordinary skill in the art of video circuit design, a suitable circuit, including buffer 102 and the back porch clamp, is illustrated in FIG. 6. The B_FLAG signal that controls Q8 is coincident with the back porch as determined from the color burst. If the video signal does not exceed the threshold value set by means of resistor R12 at any point within the black detection window, latch 112 is not triggered and the output thereof provided to microprocessor 120 indicates that the frame was black. On the other hand, if the video signal exceeds the threshold at any point within the black detection window, latch 112 is triggered and the output thereof is interpreted as indicating a non-black frame.

The present invention also analyzes the audio signal to detect silent frames, i.e., frames (fields) in which the audio signal fails to exceed a predetermined threshold. The left and right audio signals from VCR 10 (if stereo signals are provided) am summed and tested against a threshold in silent frame detector 114. This circuit is essentially identical to black frame detector frame 110 and is also gated by the black detection window from circuit 106. As in the case of black frame detection, any audio signal within the black detection window will trigger latch 116 and provide an indication to microprocessor 120 that an audio signal was detected within the frame.

Figure 7:
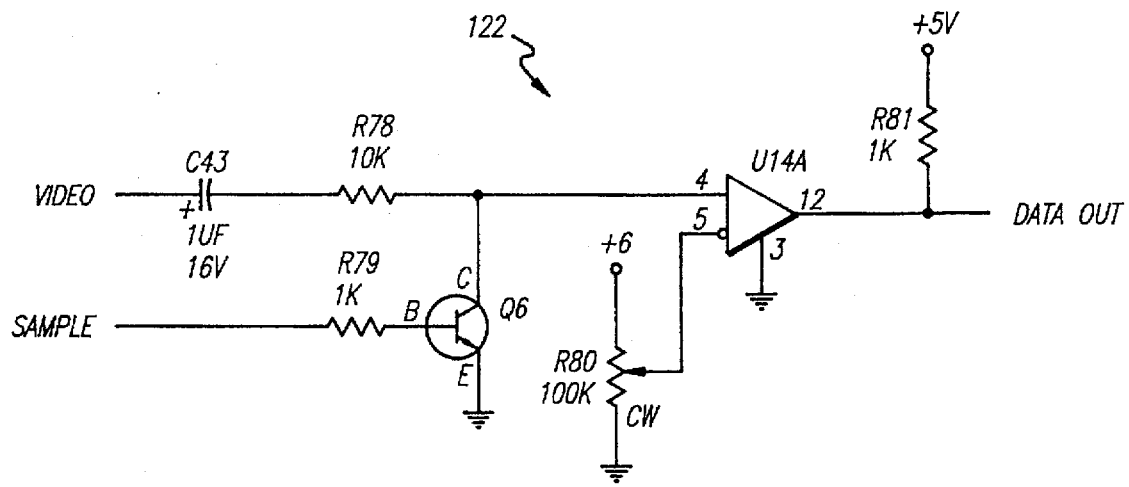
FIG. 7 is a schematic diagram of a time code decoder circuit suitable for use with the present invention.

Time codes written within the video signal are detected by time code decoder 122. This circuit receives the output from buffer 102 and the time code window from circuit 108. As previously discussed, the time code is inserted into the back porch of the video signal, immediately following the color burst. The time code comprises a single bit in each horizontal line where a normal blanking level indicates a logical zero and a highly attenuated signal (i.e., "whiter than white") represents a logical one. A suitable circuit for time code decoder 122 is illustrated in FIG. 7. The SAMPLE signal that controls Q6 is the data window on the back porch of the video signal. The position of the time code data window relative to the horizontal sync pulse is adjusted during a Set Up mode of operation as will be subsequently described.

With continued reference to FIG. 4, a television antenna or cable system outlet is coupled to the ANT IN terminal of control unit 12 and is applied as the input to splitter 130. Splitter 130 is a simple three dB splitter with its outputs coupled to RF switch 132 and attenuator 134. RF switch 132 permits the raw antenna or cable signal to be passed directly to the RF OUT terminal for viewing on the television receiver. This signal path is necessary in the event that it is desired to record one program while viewing another. Without this signal path, the time coding scheme that is used would insert random noise into the video signal on all television channels, except for the one that is being recorded. In order to provide a noise free RF signal to the television receiver, it is necessary to bypass attenuator 134. A manually operated "TV/VCR" switch is provided on control unit 12 to control the operation of RF switch 132.

RF switch 132 also receives an input from RF modulator 136. This device is a conventional channel 3/4 modulator for generating a television compatible RF signal modulated with the video signal received from video switch 138. This latter switch selects either the video output from buffer 102 or the output from video generator 140 depending upon the VCR mode of operation. During playback of a videotape, it is preferable that the TV screen be blanked while the VCR is in the fast scan mode. To achieve this, video generator 140 provides a video signal to generate a predetermined video format such as a solid blue or other color screen. Video switch 138 selects the VCR video signal during the normal play mode and selects the output of video generator 140 during the fast scan mode.

Attenuator 134 "writes" time code information onto the video signal by selectively attenuating the broadband RF signal as described above. The attenuator may be conveniently implemented with a PIN diode switch. A single bit is written on each horizontal line under the control of time code pulse generator 142, which receives the digital data to be encoded from microprocessor 120. This data is preferably provided to generator 142 as a serial burst of five bytes once each video field, with the appropriate data bits and byte delimiters being clocked out with each time code window.

As is apparent from the discussion thus far, the operation of control unit 12 is controlled by microprocessor 120. In a preferred embodiment of the invention, microprocessor 120 comprises an 8-bit 8031 chip operating at 30 megahertz. Operating instructions for the operation of microprocessor 120 are stored in read only memory (ROM) 150, which, in a preferred embodiment, is implemented as a 64K EPROM device. A writeable memory may be employed if it is desired to update the operating software as discussed above. Random access memory (RAM) 152 provides a scratch pad memory and, most importantly, stores the playback map information generated when a television program is recorded. RAM 152 (32K in the preferred embodiment) is nonvolatile and is provided with a battery or supercapacitor to preserve the playback map data in the event of power failure.

IR processor 154 controls the operation of IR emitter 34. IR processor 154 preferably contains a library of the IR commands used by various makes and models of VCRs. Such processors are commercially available and are widely used in "universal" remote control transmitters.

Control unit 12 operates on conventional household current provided to power supply unit 156. This unit provides the operating voltages for all of the digital and analog circuitry of control unit 12. The line power input is also coupled to current sensor 158 which provides a power receptacle for VCR 10 and measures the current drawn by the VCR. The current sensor is readily implemented with a small transformer coupled across the VCR power supply receptacle and a successive approximation analog-to-digital converter using a resistor-ladder and a comparator.

Operational Description

Having thus described a hardware system for implementing the present invention, the sequence of operational events will be more fully described with continuing reference to FIG. 4 and further reference to FIGS. 8–12. It will be appreciated that the events to be described are best implemented by a sequence of program steps controlling the operation of microprocessor 120. As mentioned above, this sequence of program steps is stored in ROM 152.

Control unit 12 has four basic modes of operation. These are: Set Up, Standby, Recording and Playback. The Recording mode includes a post-processing submode during which each segment of a recording session is classified as either a program segment or a commercial message. Each of these modes is discussed below.

Control unit 12 is provided with a momentary contact switch to place the unit into the Set Up mode. The purpose of the Set Up routine is to initialize the control unit for operation with the particular VCR to which it is connected.

Figure 8:
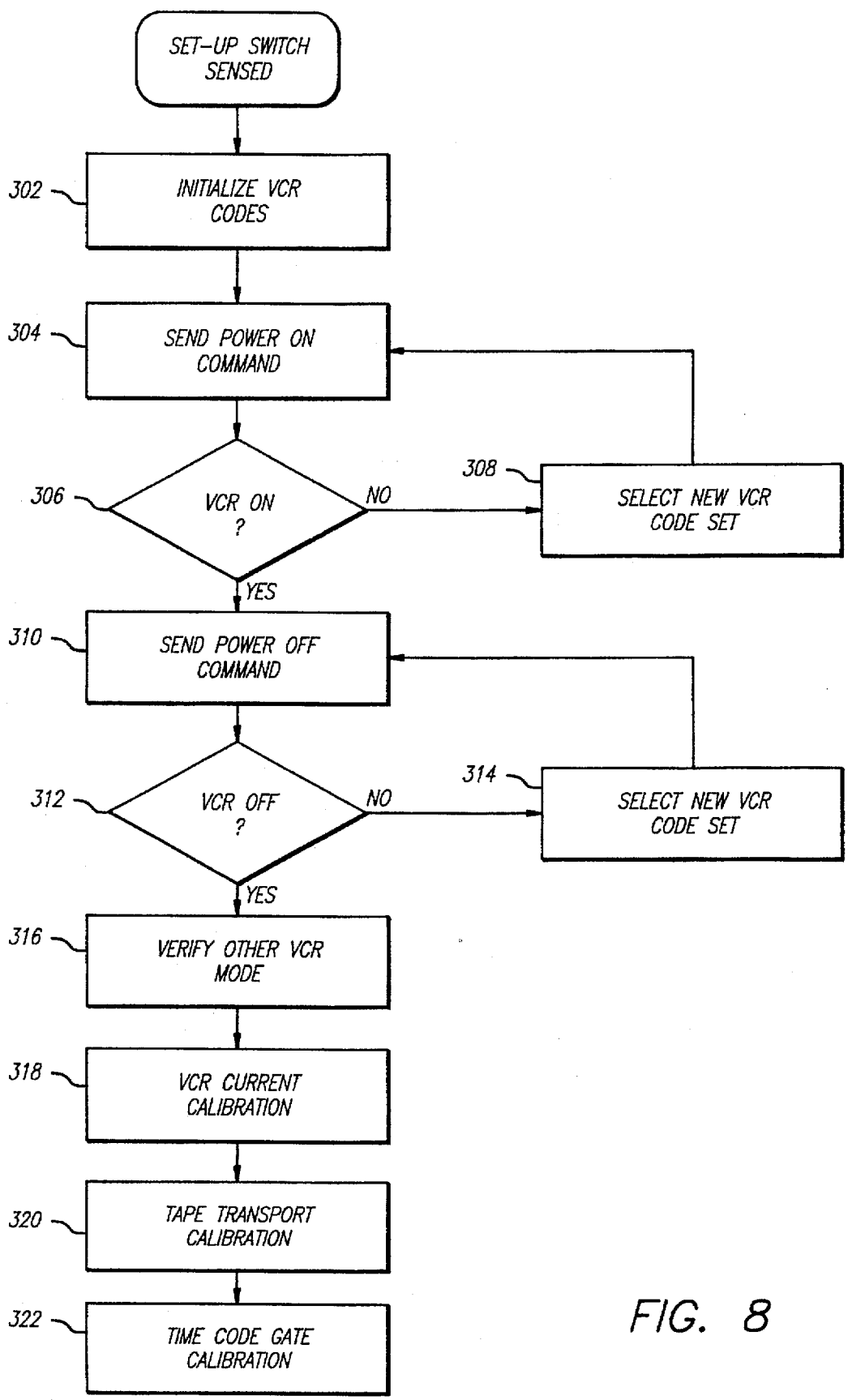
FIG. 8 is a functional flow diagram of the Set Up routine of the present invention.

This involves selecting the proper set of remote commands and calibrating the current draw and video delay timing of the VCR. Ordinarily, the Set Up routine is only run when the control unit is first installed. Thereafter, the Set Up routine would only need to be run again if the control unit is coupled to a different VCR. Prior to depressing the Set Up switch, the user simply inserts a fresh videotape into the VCR, tunes the VCR to a clear television signal and insures that the VCR is in the POWER OFF mode, A functional flow diagram of the Set Up routine is shown in FIG. 8. As mentioned above, the routine is entered when actuation of the Set Up switch is detected. The IR processor 154 contains a library of VCR commands associated with various makes and models of VCRs. At step 302, a pointer is initialized to the first set of commands in the library. Proceeding to step 304, the VCR POWER ON command, as defined in the first set of commands, is sent to the VCR by the IR emitter 34. The current drawn by the VCR is compared to a threshold value at step 306 to determine if the VCR responded to the POWER ON command. Alternatively, the VIDEO IN terminal may be monitored for the appearance of a signal, which would indicate that the VCR turned on. If the VCR did not respond, the next set of VCR commands is selected at step 308 and POWER ON command is again sent to the VCR. This process continues until it is determined from the current draw that the VCR has responded appropriately to the POWER ON command.

Once the VCR is on, the POWER OFF command from the currently selected set of commands is sent to the VCR at step 310. The current drawn by the VCR or the video signal is again monitored at step 312 to determine if the VCR has properly responded to the POWER OFF command. If the VCR does not turn off at step 312, the next set of VCR commands is selected at step 314 and the process again repeats until an appropriate response by the VCR is detected.

Once the POWER ON/OFF commands have been verified, commands are sent to exercise the PLAY and RECORD modes of the VCR. These operations proceed in essentially the same manner as just described until the appropriate set of commands has been located. This command selection process is fully automated and does not require the user to enter any information into the control unit or to otherwise participate in the Set Up process.

After the correct set of VCR commands is selected, the current draw of the VCR in the PLAY and RECORD modes is calibrated at step 318. This is done simply by placing the VCR into the PLAY and RECORD modes for a brief period of time and storing the measured current values received from the current sensor. These values will subsequently be used for determining the user controlled mode of VCR operation.

At step 320, the tape transport of the VCR is calibrated for use during the Playback mode in estimating the time required to scan past a commercial cluster. This is accomplished by recording a section of the videotape, during which time codes are written in the normal fashion. The tape is then rewound to the beginning of the recorded section and played in the fast SCAN mode for a predetermined period of time t. The VCR is then switched back to the normal PLAY mode and the time code value (i.e., the field count) is read to measure the number of video fields that were scanned past. The approximate ratio of the fast SCAN speed to normal PLAY speed is simply equal to the number of fields scanned divided by 60t. Since the ratio thus computed is affected by the speed-up delay of the tape transport, the process is repeated for different values of t. Linear regression of the collected data yields the constants m (speed ratio) and b (delay offset) where:

$$\text{\#of fields scanned} = mt + b \quad (1)$$

The set up routine also calibrates the delay of the video signal through the VCR at step 322. To perform this calibration, timing pulses are inserted into the RF signal that is supplied to the VCR from the ANT OUT terminal of control unit 12. These pulses are detected in the video signal received at the VIDEO IN terminal of control unit 12 as described above. The position and width of the time code window are adjusted by the microprocessor until the pulses are reliably read from the video signal. When all calibrations have been completed, the control unit enters the Standby mode.

Figure 9:
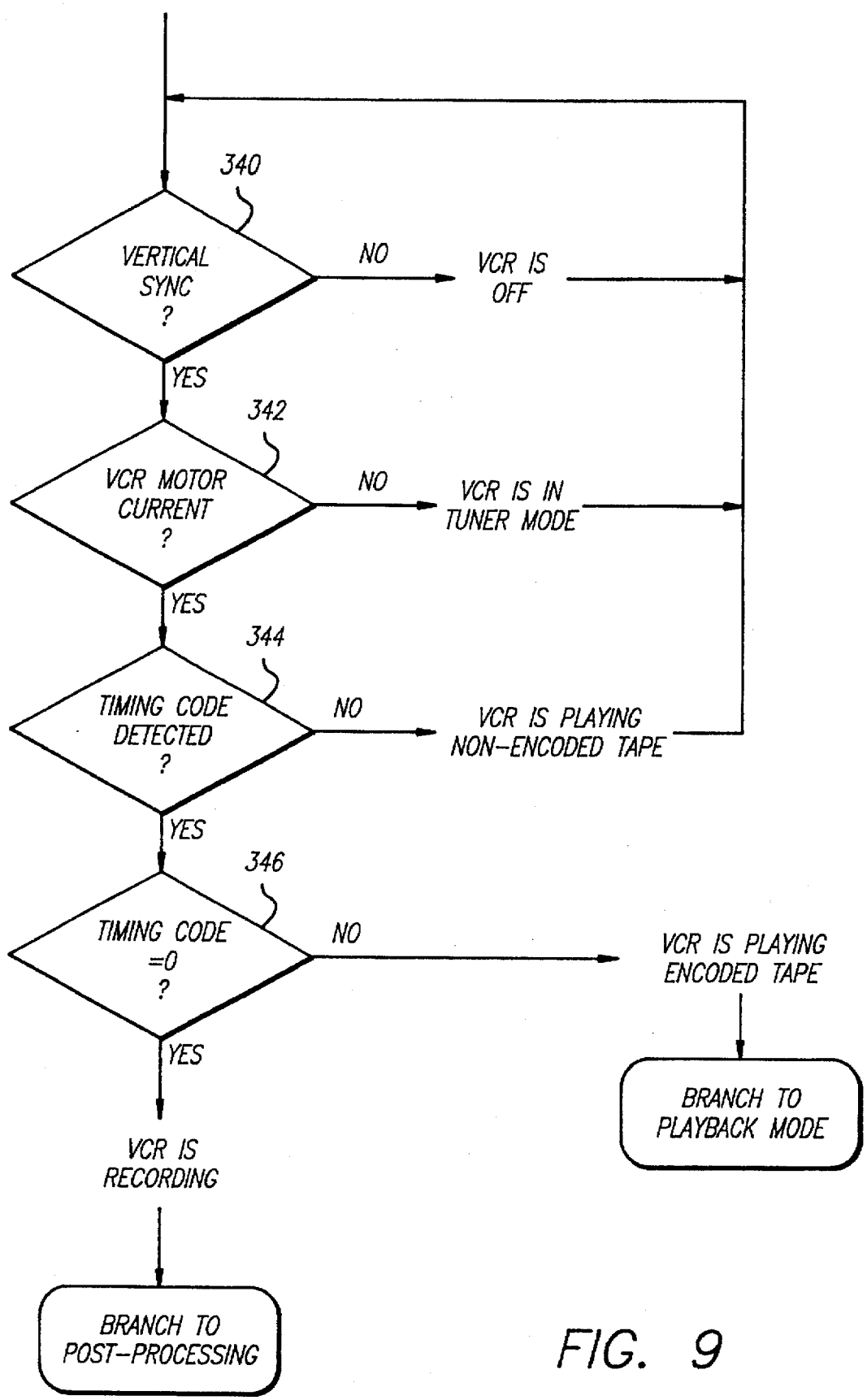
FIG. 9 is a functional flow diagram of the Standby routine of the present invention.

FIG. 9 is a functional flow diagram of the Standby mode of operation. Beginning at step 340, the signal received at the VIDEO IN terminal of control unit 12 is monitored for the presence of vertical sync pulses. If no such pulses are detected, there is no video signal present and the VCR is presumed to be off. If vertical sync pulses are detected, the VCR is on and the magnitude of the VCR current is checked at step 342. During the Set Up routine discussed above, the current drawn by the VCR is measured in various modes of operation. While it may be difficult to distinguish all of the VCR modes from one another based on the amount of current drawn, it is certainly easy to determine whether the VCR tape transport motors are on or not. The relative values of the VCR current detected during the Set Up routine when the VCR motors are on and when they are off are stored in non-volatile memory.

If the VCR current measured at step 342 indicates that the VCR tape transport motors are off, then the VCR is in a "tuner" mode; i.e., the VCR is on, but is neither playing nor recording a videotape. However, if the VCR motors are on, then the VCR must be in either the PLAY or RECORD modes. If these modes cannot be distinguished based on the VCR current draw, the video signal is examined for the presence of time code pulses at step 344. Time codes with a value of "0" are continually sent to the time code pulse generator while in the Standby mode. If time code pulses are not detected at step 344, the VCR must be playing a videotape that was not previously encoded with timing information. In this case, control unit 12 remains in the Standby mode. On the other hand, if time code pulses are detected, the time code value is examined at step 346. If the value remains at "0", the video signal being received from the VCR is being demodulated from the encoded RF signal, and the VCR must therefore be in the RECORD mode. Control then branches to the Recording mode of operation. If the time code is non-zero, it can only be originating from playback of a previously encoded videotape. In this case, control branches to the Playback mode of operation.

Figure 10:
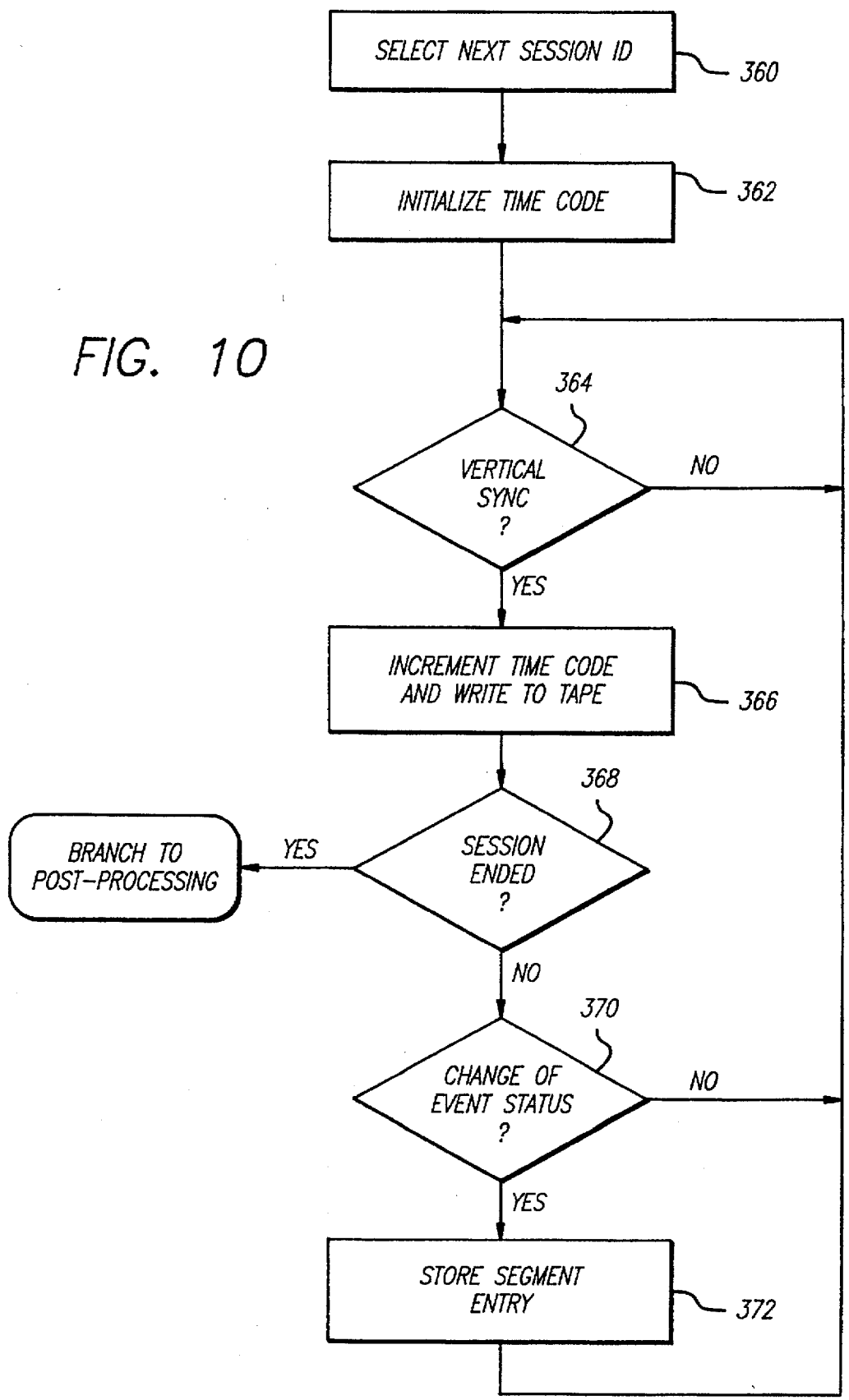
FIG. 10 is a functional flow diagram of the Recording routine of the present invention.

FIG. 10 is a functional flow diagram of the Recording mode. Beginning at step 360, an identification code is selected for the recording session. Generally, the session identification code may be simply incremented from that of the most recently recorded session. However, once the playback map memory has been filled, it may be preferable to utilize the session identification code of a recently discarded playback map to ensure that the session identification codes are not duplicated within the playback map memory. In any event, once the session identification code is selected, the time code for the current recording session is initialized at step 362. Proceeding to step 364, the vertical sync pulses are monitored to detect advancement of the video signal to a new field. When the vertical sync pulse is observed, the time code is incremented at step 366 and is written onto the videotape by attenuation of the RF signal as has been described above.

Step 368 tests whether the recording session has ended by monitoring the continued presence of a video signal. If the VCR has turned off, the program branches to the post processing routine which is described below. As long as the recording session continues, step 370 looks for a change in the event status flags. In the described embodiment, these are the outputs of the black frame detector latch 112 and the silent frame detector latch 116. It will be appreciated that other or additional events detectable within the video signal may also be utilized. If there has been no change in the black frame flag, the program returns to step 364 to await the next vertical sync pulse. If there is a change, i.e., if the previous frame was black and the current frame is non-black or if the previous frame was non-black and the current frame is black, then an entry comprising the state of both event status flags is written into a scratch pad portion of the RAM memory. This entry comprises the current time code (field count) and the state of the two latches. A series of entries may, for example, comprise the following:

| Time Code | Black Frame | Silent Frame |
|---|---|---|
| 998 | 1 | 1 |
| 1010 | 0 | 0 |
| 1520 | 1 | 0 |
| 1531 | 0 | 1 |
| 1534 | 1 | 0 |

Entries into the scratch pad memory continue to be made in this manner until the recording session has ended.

Upon conclusion of the recording session, the data accumulated in the scratch pad memory is processed to create a playback map for the recording session. Initially, the duration dt of each recorded state of the event flags is calculated by comparing the time code with the time code of the next succeeding entry. Using as an example the list of entries above, the results would be as follows:

| Time Code | dt | Black Frame | Silent Frame |
|---|---|---|---|
| 998 | 12 | 1 | 1 |
| 1010 | 510 | 0 | 0 |
| 1520 | 11 | 1 | 0 |
| 1531 | 3 | 0 | 1 |

For each of the entries, a polynomial expression of the following form is calculated:

$$T = (A*k_A) + (B*k_B) + (C*k_B) + \ldots + (K*k_K) \quad (2)$$

The terms A, B, C, ..., K are defined for the current time code value (cur) of each entry in the scratch pad data table in accordance with the following:

| Term | Description | Variables |
|---|---|---|
| A | Number of black frames in this segment | none |
| B | searches events looking for black frames within cur ± (B_MEAN ± B_ERROR_BOUND) | B_MEAN ≈ 30 sec.<br>B_ERROR_BOUND ≈ 5 sec |
| C | searches events looking for black frames within cur ± (C_MEAN ± C_ERROR_BOUND) | C_MEAN ≈ 60 sec.<br>C_ERROR_BOUND ≈ 5 sec |
| D | searches events looking for black frames within cur ± (D_MEAN ± D_ERROR_BOUND) | D_MEAN ≈ 120 sec.<br>D_ERROR_BOUND ≈ 5 sec |
| E | searches events looking for silent frames within cur ± (E_MEAN ± E_ERROR_BOUND) | E_MEAN ≈ 30 sec.<br>E_ERROR_BOUND ≈ 5 sec |
| F | searches events looking for silent frames within cur ± (F_MEAN ± F_ERROR_BOUND) | F_MEAN ≈ 60 sec.<br>F_ERROR_BOUND ≈ 5 sec |
| G | searches events looking for silent frames within cur ± (G_MEAN ± G_ERROR_BOUND) | G_MEAN ≈ 120 sec.<br>G_ERROR_BOUND ≈ 5 sec |
| H | searches events looking for black frames within cur ± (H_MEAN ± H_ERROR_BOUND) | H_MEAN ≈ 15 sec.<br>H_ERROR_BOUND ≈ 3 sec |
| I | searches events looking for silent frames within cur ± (I_MEAN ± I_ERROR_BOUND) | I_MEAN ≈ 15 sec.<br>I_ERROR_BOUND ≈ 3 sec |
| J | examines surrounding events to see if they have been classified as commercials | TBD |
| K | examines dt of black frames marking the beginning of a suspected cluster of commercials | TBD |

These terms have been selected as attributes of commercial television programming that provide an indication of when a commercial message is being shown. Additional terms may be added to reflect further attributes of television commercials. The weighting constants and the error bounds for the polynomial are best determined heuristically by processing actual television broadcast signals. As of the date of this application, the best values for the weighting constants and the error bounds have yet to be determined. It has been determined, however, that $k_A$ should be set to zero or a very small value since the number of consecutive black or silent frames does not seem to be an important factor in classifying segments of the video signal.

The weighting value for each of polynomial terms B–I is calculated according to the position of the found event relative to the mean value. FIG. 11 illustrates the manner in which the value of $k_B$ is calculated for events occurring within approximately ±30 seconds of the cur frame count. If an event is found at exactly the B_MEAN value, i.e., at exactly +or −30 seconds, $k_B$ is set equal to a maximum value of 256. As the position of the found event deviates from B_MEAN, the value of $k_B$ is reduced linearly until a value of zero is reached at the error bound.

For all of the data entries made during a recording session, the polynomial is calculated on a term by term basis. That is, the A term is calculated for all entries, then the B term, etc.

Thus, the J and K terms are calculated based on the preceding terms. The result is a numerical value for each entry in the data table. This value is then compared to a numerical threshold which, preferably, is also determined heuristically in the manner of the weighting constants and error bounds. Entries in the data table with a polynomial result exceeding the threshold are classified as belonging to a commercial message cluster, whereas entries with a polynomial value below the threshold are classified as program material. The final data structure, which is stored in RAM as the playback map for the recording session, comprises the four-byte time code for the beginning of each group of consecutive entries that have been classified as belonging to a commercial cluster and a two-byte duration value indicating the length of the commercial cluster. Each entry in the playback map thus designates a portion of the recorded signal to be skipped when the videotape is replayed.

In addition to storing the playback map in RAM, it may be desirable to archive the playback map on the videotape itself at the beginning, ending or both of the recording session. In this way the playback map for a particular recording session may be recovered if it cannot be located in RAM when the videotape is replayed. The playback maps for all recording sessions on a tape may also be stored at the beginning and ending of the tape. This is useful in the event that power to the RAM is interrupted and also permits a videotape recorded on one system to be played, without commercials, on a different machine.

Figure 12:
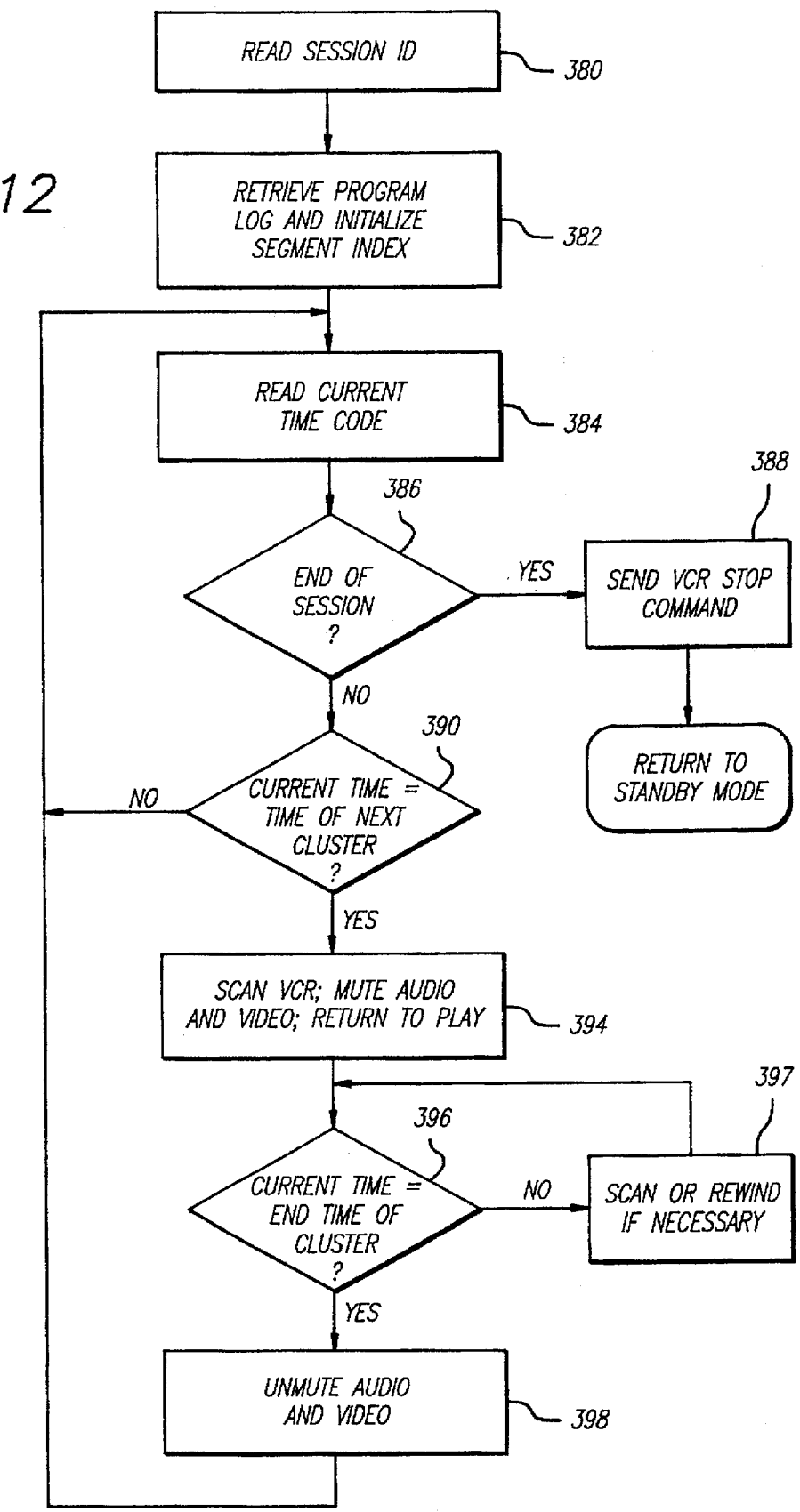
FIG. 12 is a functional flow diagram of the Playback routine of the present invention.

FIG. 12 is a functional flow diagram of the Playback mode processing routine. Beginning at step 380, the session identification code is read from the video signal. The corresponding playback map is then retrieved from memory at step 382. If there is no stored playback map corresponding to the session identification code read from the tape, the tape is played as if it was a non-encoded tape. Alternatively, as mentioned just above, the program log may be restored to RAM from the videotape if it has been archived thereon. After the playback map has been retrieved, the current time code is read and interpreted at step 384. The current time code is checked against the ending time code of the recording session at step 386 and, if the end of the session has not yet been reached, the current time code is compared to the stored time code for the next commercial cluster in the playback map. The program loops until the current time code is equal to the stored beginning time of the next cluster. At that point, the VCR is commanded into the fast SCAN mode (i.e., there is a commercial cluster to be eliminated) and the audio and video signals are muted at step 394. The VCR remains in the fast SCAN mode for a period of time t corresponding to the duration of the commercial cluster, where t is calculated in accordance with equation (1). Video muting provides a solid blue screen on the television receiver as previously described.

After time t has elapsed, the VCR is returned to the normal PLAY mode and the time code is examined at step 396. If the tape has reached the desired position at the end of the commercial cluster, the video and audio signals are unmuted at 398 and control returns to step 384 to begin searching for the next commercial cluster. If the tape has not reached the end of the cluster, the VCR remains in the normal PLAY mode, but with the audio and video signals still muted. If there is a substantial difference between the current time code and the end of the commercial cluster or if the end point was overshot, it may be necessary to briefly return to the fast SCAN mode or rewind the tape, respectively. In order to minimize these latter possibilities, it is desirable to dynamically adjust the constants m and b based on the sign and magnitude of the prediction error.

The program continues in this fashion until the end of the recording session is reached, at which point a STOP command is sent to the VCR at step 388 and the program returns to the Standby mode.

"Built-In" Embodiment

The foregoing discussion has concentrated on an embodiment of the invention constructed as a self-contained unit as illustrated in FIGS. 1 and 5; however, the invention may be advantageously combined with a VCR. In this case, certain significant advantages are realized. For example, the VCR mode may be directly controlled rather than via an infra-red signal. Furthermore, combining the control unit with the VCR obviates the need to write the time and tape identification codes onto the broadband RF signal.

Figure 13:
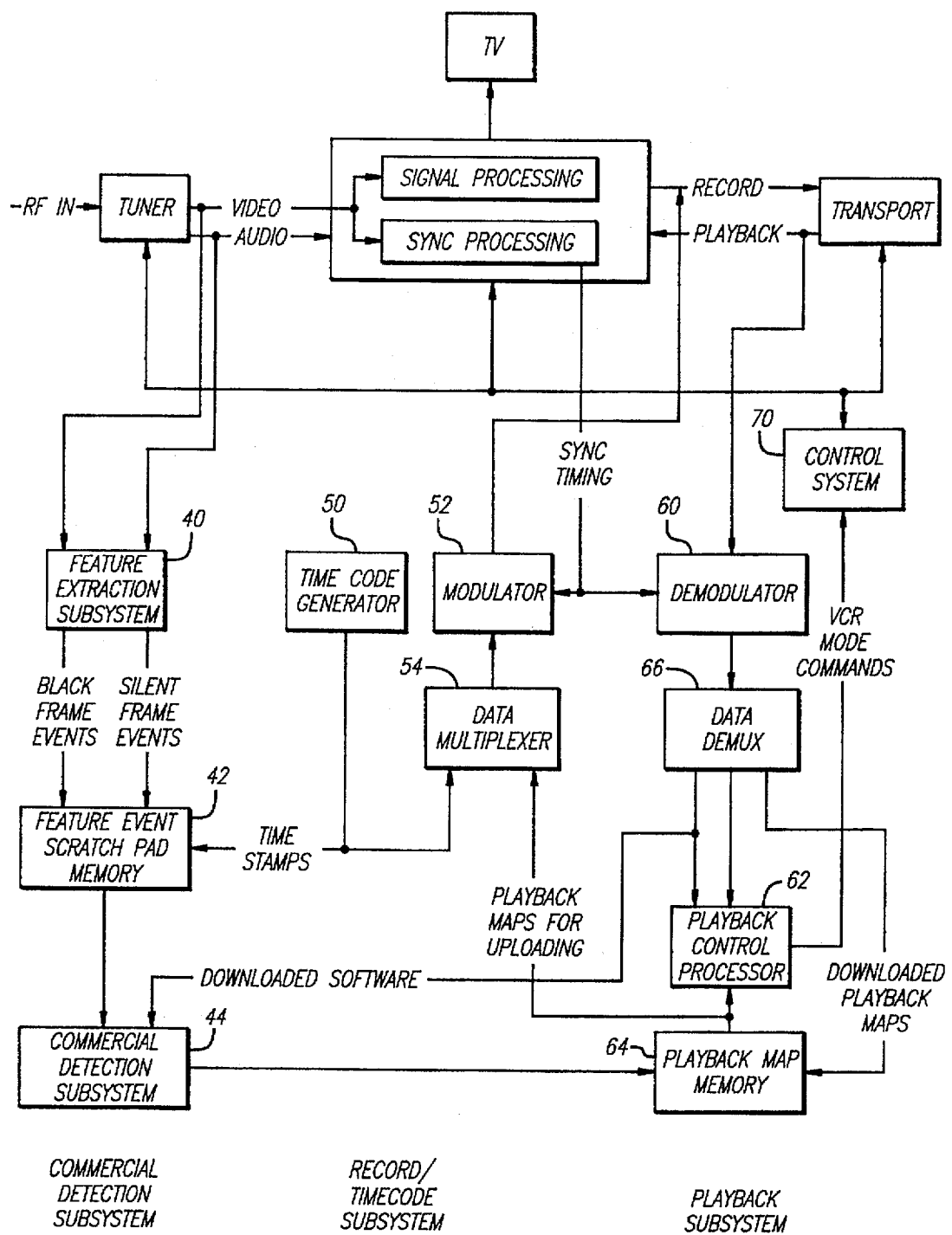
FIG. 13 is a functional block diagram of a commercial elimination system according to the present invention suitable for use as a built-in feature of a VCR.

FIG. 13 is a functional block diagram of the present invention as it may be embodied as a built-in feature of a VCR. This figure should be compared with FIG. 3 discussed previously. It will be observed that there is no processing of the broadband RF signal whatsoever beyond the processing ordinarily performed in a VCR. Furthermore, play/scan commands may be issued directly from the playback control processor 62 to the VCR's control system 70.

In the illustrated embodiment, the video signal from the playback head of the VCR is demodulated by a demodulator 60 as has already been described, and the recovered data are presented at data demultiplexer 66. The data encoded on the videotape may contain time codes, downloaded playback maps for storage in the playback map memory 64 and/or downloaded software to replace or supplement the software that controls operation of the commercial detection processor 44 and/or the playback control processor 62. It is preferable in this embodiment to expand the time code format to include a machine identification byte so that videotapes previously encoded by one system may be played on another system without inadvertantly retrieving a program map from the second system's RAM with the same session identification. Alternatively, the session identification code may include a random component, such as time of day, to avoid duplication of codes.

A data multiplexer 54 is included in the record/time code subsystem to provide time codes and/or playback maps for uploading onto a videotape to data modulator 52. The output of modulator 52 is fed directly to the video signal that is recorded on the videotape.

Since the time code data may be modulated directly on the video signal, the built-in embodiment lends itself to more efficient encoding schemes than the back porch pulse scheme described above. For example, a conventional vertical interval time code (VITC) may be readily encoded onto the video signal. Standards for VITC have been established by the Society of Motion Picture and Television Engineers (SMPTE) and European Broadcasting Union (EBU).

When the present invention is provided in combination with a VCR, it is possible to provide alternative sensors for retrieving the time code data from the videotape. For example, an optical encoding scheme could be employed using specially prepared videotapes with permanent optically encoded markings. Alternatively, unmodified standard videotapes could be employed by recording a time code on the tape with a dedicated recording head at the same time the video signal is recorded. The time code could then be recovered on playback with a dedicated read head. Such time code information could be recorded, for example, in the guard band separating the audio tracks.

Further Alternative Embodiments

As just mentioned, the system of the present invention may be adapted to utilize a specially prepared video cassette with permanently encoded timing indicia. In one such alternative embodiment, the video cassette may contain video tape that has been treated as more fully described below to selectively remove the oxide along a longitudinal stripe near one edge of the tape. The oxide is removed at periodic intervals along the tape in a pattern that encodes a unique identification code for the cassette and a time code indicative of the position of the tape from the beginning thereof.

In yet another alternative embodiment of the present invention, the video cassette may be provided with a microtransmitter capable of communicating to a corresponding receiver in control unit 12. During playback of a tape (and, for that matter, during the recording process as well), the transmitter would continuously send encoded data to the control unit indicating the position of the tape in the cassette. Such data may be obtained by various means, such as by an optical code applied to the back side of the tape, by an encoded spool in the cassette or by a revolution counter driven by one of the cassette spools.

It is possible to practice the present invention even without a direct indication of the tape position. In this regard, the fast scan speed of the VCR may be calibrated during the initial Set Up procedure. If the fast scan speed of the VCR is known with sufficient accuracy, the instantaneous position of the tape may be computed within control unit 12 as a function of time from the beginning of the recorded program. This requires that playback always start at the beginning of the recorded program or that some other means be provided for informing the system where playback is begun. It is also necessary to inform the system of the tape identification so that the appropriate stored data is utilized. Although this approach does not have the timing accuracy afforded by a specially prepared video cassette, it should provide adequate results, particularly if the tape position during playback is periodically recalibrated against the data stored during the recording process by means of a pattern matching algorithm.

Time Coded Videotape

A specially prepared videotape suitable for use with the above-mentioned alternative embodiment of the invention will now be described. FIG. 14 illustrates the manner in which signals are recorded on a conventional videotape for home use. The videotape 710 comprises a plastic substrate, typically a polyester film, coated with a magnetic material, such as iron oxide or chromium dioxide. Three different signals are recorded on the tape. Audio information (either monaural or stereo) is recorded on one or both of audio tracks 712a and 712b adjacent to edge 709 of the tape. A control track 714 is recorded adjacent to opposite edge 711 of the tape. Control track 714 records a standardized analog signal for use in synchronizing playback of the videotape.

The majority of the surface of videotape 710 is devoted to recording the video signal in a series of substantially transverse tracks 716 that are produced as the record head scans a helical path across the moving tape. In the popular video home system (VHS) format, each video track 716 contains one field of video information (½ frame or ⅟₆₀th second). It will be recognized that the viewable video image, which typically comprises approximately 480 lines of a standard 525 line television raster, is contained in the center portion of videotape 710, whereas those portions of tracks 716 adjacent to tracks 712b and 714 contain the video signals for raster lines that are generally outside of the viewable image.

Referring now to FIG. 15, a method for permanently encoding videotape 710 with timing information is illustrated. The videotape is treated to selectively remove the magnetic coating within a narrow longitudinal stripe adjacent to audio tracks 712. Alternatively, stripe 720 could be located adjacent to control track 714, the objective being to remove the magnetic coating within the region scanned by the read heads of a VCR, but outside of the region of tape 710 on which the viewable video image is recorded and also outside of the region where the vertical blanking interval is recorded containing non-viewable information, such as closed captioning signals. Instead of removing the magnetic coating, it may be selectively depolarized or otherwise treated within stripe 720 so that there is a detectable change in the recorded signal at those locations where the coating has been treated.

The magnetic coating is selectively removed within stripe 720 at predetermined "bit" intervals. For example, as shown in FIG. 10, the magnetic coating is removed in intervals a, c, d and f, but is not removed in intervals b and e. This may be interpreted as the binary sequence 101101. As will be appreciated by those skilled in the art, more sophisticated data encoding techniques to provide error checking and correction may be employed.

As the videotape is played, the video signal in the region outside of the viewable image will experience periodic drop outs as the playback head scans across areas where the magnetic coating has been removed. These drop outs are easily detected, and the timing sequence of the drop outs is analyzed to recover the digital information encoded onto the tape. In this regard, each bit interval preferably spans a predetermined number of video frames so that the video sync pulses may be used to clock a bit counter.

The timing code may be marked at any convenient interval. If the time code is marked at nominal one second intervals, 16 bits of information will accommodate any currently contemplated combination of tape length and recording speed. It is important to recognize that the timing code serves primarily as an identifier of tape position rather than time, and thus the codes will provide valid information regardless of the speed at which the tape is recorded and played.

Figure 16:
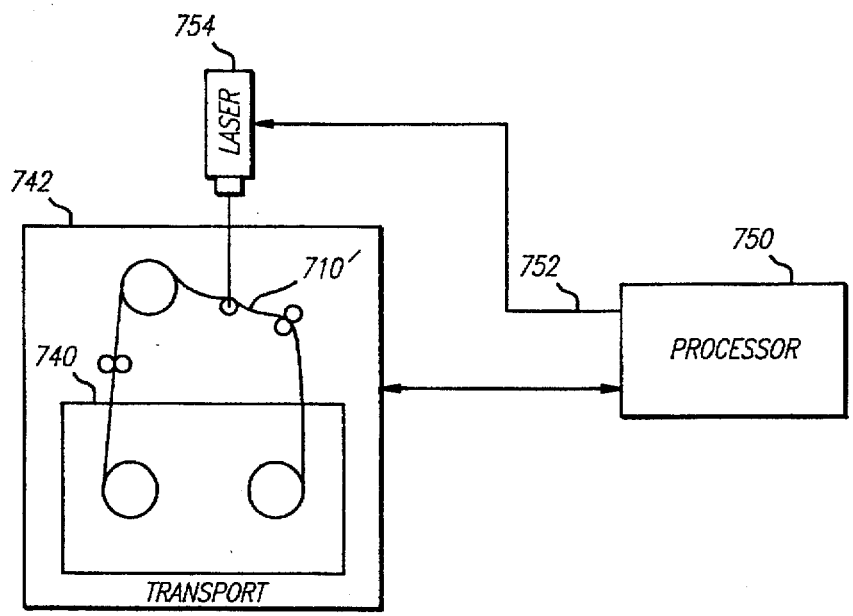
FIG. 16 illustrates a system for making the videotape shown in FIG. 15.

FIG. 16 illustrates a method by which a standard videotape cassette may be processed to encode it in the manner described above. The tape is passed at a controlled high speed by transport mechanism 742 past a laser 754. After a suitable delay to allow sufficient tape leader to pass, processor 750 begins to generate a coded output signal to laser 754 which is focused on the videotape at the lateral position of stripe 720. As the videotape advances, the appropriate timing code is written onto the tape by laser 754 in the proper bit sequence. After each bit sequence is written, processor 750 increments the timing code and the sequence of events continues until the entire length of the videotape has been encoded. Of course, the videotape may be processed in bulk form prior to or concurrently with the cassette loading operation.

Other coding techniques may be employed as well. As mentioned above, the magnetic coating may be depolarized or otherwise treated instead of being removed. Furthermore, the videotape may be optically encoded, such as with a bar-code pattern applied to the back (uncoated) side of the tape. Of course, this technique would not allow recovery of the encoded information from the video signal on playback, but, as previously explained, this technique may be advantageously employed if the control unit and VCR are combined. In the case of a self-contained control unit, it would be necessary to provide an optical decoder, preferably within the video cassette itself. The timing information from the optical decoder could be conveniently transmitted to an editing control unit by a microtransmitter also housed within the video cassette. Alternatively, the video cassette and the editing control unit may be coupled by an umbilical cable. In this regard, home VCRs are now almost universally front loading machines so that an umbilical cable can easily pass through the loading door even while the video cassette is being played.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

We claim:

1. A video recording and playback system comprising:
   (a) a video recorder/player having a record mode, a play mode and a fast scan mode;
   (b) a recording medium for insertion into the video recorder/player so as to record a video signal thereon in the record mode and play the video signal recorded thereon in the play mode, said video signal including program material and commercial message material;
   (c) event detection means for detecting events within the video signal;
   (d) a first data memory for storing times of occurrence of the events in the record mode;
   (e) means for analyzing the times of occurrence of the events to classify segments of the video signal between events as either program material or commercial message material;
   (f) a second data memory for storing a playback map identifying segments of the video signal classified as commercial message material;
   (g) means for selecting between the fast scan mode and the play mode of the video recorder/player during playback of the recording medium having the video signal recorded thereon so as to scan past the segments of the video signal classified as commercial message material.

2. The system of claim 1 wherein the recording medium is a videotape.

3. The system of claim 1 wherein the recording medium is an optical disc.

4. A method of automatically eliminating portions of a recorded video program comprising the steps of:
   (a) recording a video signal on a recording medium;
   (b) monitoring the video signal as it is recorded to detect events therein;
   (c) storing data representative of a time of occurrence of each event;
   (d) analyzing the data to classify segments of the video signal between events as one of a first and second type;
   (e) storing a playback map containing entries, each of which identifies a segment of the video signal classified as the second type;
   (f) playing the recording medium to reproduce the video signal recorded thereon;
   (g) rapidly scanning past each said segment of the video signal classified as the second type.

5. The method of claim 4 wherein the events detected in the video signal comprise black frames.

6. The method of claim 5 wherein the events are detected by comparing the video signal to a threshold black level.

7. The method of claim 4 wherein the events detected in the video signal comprise silent frames.

8. The method of claim 4 wherein the step of analyzing data comprises analyzing the spacing and duration of events.

9. The method of claim 4 wherein the step of analyzing data performed subsequent to recording an entire video program on the recording medium.

10. The method of claim 4 wherein the step of analyzing data comprises calculation of a polynomial expression to assign a weighted value to each event.

11. The method of claim 10 wherein the polynomial expression includes terms computed as a function of surrounding events.

12. The method of claim 4 wherein the playback map is recorded on the recording medium.

13. The method of claim 4 wherein the recording medium is a videotape.

14. The method of claim 4 wherein the recording medium is an optical disc.

15. The method of claim 12 wherein the recording medium is a videotape.

16. The method of claim 12 wherein the recording medium is an optical disc.

17. A video recording system comprising:
   (a) a video recorder;
   (b) a recording medium for insertion into the video recorder so as to record a video signal thereon;
   (c) a first data memory for storing data representative of respective times of occurrence of a plurality of events in the video signal as the video signal is recorded;
   (d) means for analyzing the data stored in the first data memory to classify segments of the video signal between events as one of a first and second type;
   (e) a second data memory for storing a playback map of the recorded video signal, said playback map having a plurality of entries, each entry identifying one of said segments of the video signal that have been classified as the second type.

18. The system of claim 17 wherein the recording medium is a videotape.

19. The system of claim 17 wherein the recording medium is an optical disc.

20. A video recording system comprising:
   (a) a video recorder for recording a video signal;
   (b) means for detecting events within the video signal as it is recorded;
   (c) a data memory for storing data representative of respective times of occurrence of a plurality of said detected events within the video signal;
   (d) means for analyzing the data stored in the data memory to classify segments of the video signal between events as being one of a first type for retention during playback and a second type for elimination during playback;
   (e) means for storing a playback map of the recorded video signal, said playback map having a plurality of entries, each entry identifying a segment of the video signal to be eliminated during playback.

21. The system of claim 20 further comprising:
   (i) a video player for playing the recorded video signal;
   (ii) means for causing the video player to rapidly scan past each said segment of the video signal identified in the playback map as a segment to be eliminated during playback.

22. The system of claim 20 wherein the means for storing the playback map comprises a recording medium on which the video signal is recorded.

23. The system of claim 22 wherein the recording medium is a videotape.

24. The system of claim 22 wherein the recording medium is an optical disc.

* * * * *